United States Patent [19]

Steinführer

[11] Patent Number: 4,980,894
[45] Date of Patent: Dec. 25, 1990

[54] IGNITOR FOR THE PREIONIZATION OF A GAS-DISCHARGE LASER

[75] Inventor: Gerd Steinführer, Bovenden, Fed. Rep. of Germany

[73] Assignee: Lambda Physik Forschungs-und Entwicklungs-Gesellschaft mbH, Gottingen, Fed. Rep. of Germany

[21] Appl. No.: 401,027

[22] Filed: Aug. 31, 1989

[30] Foreign Application Priority Data

Sep. 28, 1988 [DE] Fed. Rep. of Germany ....... 3832930

[51] Int. Cl.⁵ .............................................. H01S 3/097
[52] U.S. Cl. ...................... 372/86; 372/56; 372/57; 372/82; 372/87; 372/88
[58] Field of Search ...................... 372/86, 87, 88, 82, 372/57, 56

[56] References Cited

U.S. PATENT DOCUMENTS

| 4,380,079 | 4/1983 | Cohn et al. | 372/86 |
| 4,434,493 | 2/1984 | Chaffee | 372/86 |
| 4,685,272 | 4/1987 | Kamide et al. | 372/87 |
| 4,794,612 | 12/1988 | Fuke | 372/56 |

Primary Examiner—Georgia Epps
Attorney, Agent, or Firm—Brumbaugh, Graves, Donohue & Raymond

[57] ABSTRACT

An ignitor for a preionizing means of an excimer laser has an electrically conductive core which projects into the gas space of the laser and which is surrounded by a jacket of a fluoroplastic. The jacket is brought into sealing engagement with the wall of the laser gas space by means of a pressure sleeve via mating conical surfaces.

8 Claims, 1 Drawing Sheet

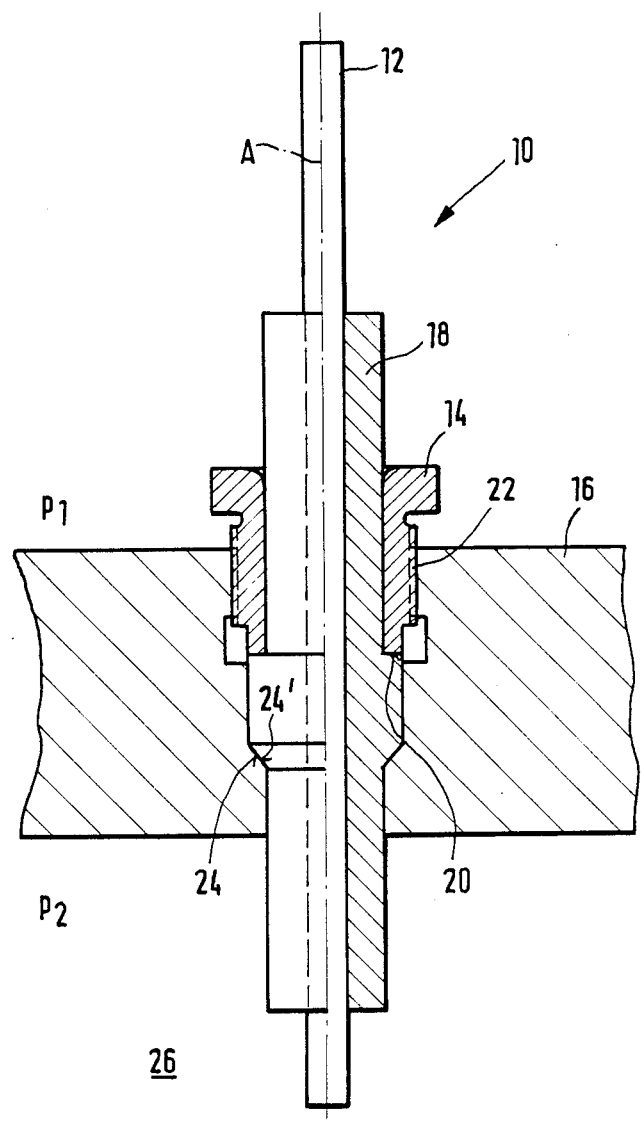

IGNITOR FOR THE PREIONIZATION OF A GAS-DISCHARGE LASER

The invention relates to an igniter for a preionizing means of a gas-discharge laser, in particular an excimer laser, comprising an electrically conducting core which projects into the gas space of the laser and which is secured insulated in a wall of the gas space.

The gas-discharge lasers in the sense of the invention are in particular those with transversal stimulation of the working gas between main electrodes, such as excimer lasers.

Such lasers generally comprise a so-called preionizing means with which the working gas is preionized prior to the ignition of the main discharge between the main electrodes. The preionization can be carried out with various means, such as electron and X-ray beams as well as preionizing sparks ignited near the main electrodes. This is known to the expert and need not be explained in detail here. The invention relates to the preionization by means of sparks It is known to provide as means for preionization by means of sparks so-called preionization yokes including a preionization strip formed integrally therewith. As a rule, a plurality of preionizing pins extend in such a preionization yoke and the spark current for the preionization flows between the tip of such a pin and an edge of the preionizing strip.

The aforementioned preionizing pins are also referred to as "igniters" because they serve to ignite the gas discharge in the gas space of the laser In the prior art igniters are known having an electrically conductive core which is surrounded by an adhered ceramic tube. The ceramic tube electrically insulates the core from the wall of the gas chamber in which the igniter is mounted and through which it passes from the outside to the inside.

The known adhered ceramic tubes have a number of disadvantages. The adhesion points may become leaky, in particular after relatively long use, i.e., gas can escape from the gas space of the laser. Also, the ceramic tube itself may exhibit a tendency to crack, in particular when temperature gradients occur.

It should moreover be remembered that the life of gas-discharge lasers, in particular excimer lasers, depends essentially on the materials used. This relates to all the parts which come into contact with the working gas of the laser, i.e., also to the igniter for the preionization. The adhesive used in the prior art can lead to contamination of the laser gas.

The invention is based on the problem of providing an igniter of the type mentioned at the beginning which has a reliable sealing effect, is simple to assemble and adjust, avoids contaminating the laser gas, permits a simple change of the cross-section of the electrically conductive core and is economical to make.

SUMMARY OF THE INVENTION

The jacket provided according to the invention and consisting of a fluoroplastic is resistant to flashover and also exhibits no tendency to crack on temperature differences. A particular sealing element, such as an 0-ring, can be dispensed with.

Adequate gas tightness can be achieved by direct spraying round of the core with the fluoroplastic to form the jacket. Satisfactory gas tightness is also achieved when a prefabricated jacket of fluoroplastic is assembled cold or preferably hot on the core.

In a preferred embodiment of the invention a pressure sleeve is provided which surrounds the jacket of plastic The pressure sleeve comprises an external thread which cooperates with an internal thread formed in the wall of the gas space and is thus screwable into the wall in the direction of the longitudinal axis of the igniter. Via a stop the pressure sleeve presses the resilient jacket in the axial direction against a conical surface in the wall of the gas space so that firstly a sealing of the gas space is effected at the conical surface and secondly a radially inwardly directed force component arises in the jacket which presses the inner surface of the jacket against the outer surface of the electrically conductive core.

The jacket preferably consists of a fluoroplastic, i.e., a fluorine-containing polymer In particular the following can be employed: PTFE, PFA, TFA, FEP, PCTFE.

BRIEF DESCRIPTION OF THE DRAWING

Hereinafter an example of embodiment of the invention will be described in detail with the aid of the drawing the single FIGURE of which is a fragmentary cross-sectional view of an igniter constructed in accordance with the invention.

DESCRIPTION OF THE PREFERRED EMBODIMENTS

The FIGURE shows schematically an ignition pin or igniter 10 comprising an electrically conductive core 12 of metal wire.

By means of a pressure sleeve 14 the igniter 10 is mounted in a wall 16 of a laser gas chamber or space.

Between the electrically conductive core 12 and the pressure sleeve 14 a jacket 18 of fluoroplastic is disposed. The jacket 18 comprises a stop 20 with which the pressure sleeve 14 is in engagement. The pressure sleeve 14 is provided at 22 with an external thread which cooperates with a corresponding internal thread in the wall 16.

When the pressure sleeve 14 is screwed into the wall 16, via the stop 20 the jacket 18 of resilient material is pressed downwardly in the FIGURE.

The jacket 18 is provided with a conical surface 24 which is in engagement with a complementary conical surface 24' of the wall 16. The force generated in the direction of the longitudinal axis A of the igniter 10 on screwing in the pressure sleeve 14 presses the two conical surfaces 24, 24' into gas-tight engagement. At the same time, at the conical surfaces 24, 24' a radially inwardly directed force component is generated in the jacket 18 and seals the contact surfaces between the core 12 and the jacket 18 in addition to the interference fit of the jacket 18 on the core 12.

The jacket 18 of a fluorinated polymer may also be directly sprayed or injection molded onto the core 12 so that a particularly intimate connection between the surfaces arises.

With the igniter described a considerable excess pressure $p_2$ can be generated in the gas space 26 of the laser (not shown). If a pressure $p_1$ obtains in the outer space, pressure differences $p_2-p_1$ greater than 10 bar can readily be achieved.

In a preferred embodiment the igniter core 12 consists of a material comprising tungsten and copper.

The igniter core material preferably comprises about 60 to 90%, preferably about 80%, tungsten with the remainder substantially copper.

In a particularly preferred embodiment the material consists of about 80% sintered tungsten powder into which about 20% copper is introduced.

The electrode described above of tungsten and copper is particularly suitable for all excimer laser gases apart from gas mixtures in which fluorides are contained.

For excimer laser gases containing fluorides the problem underlying the invention is solved by forming the igniter core of a material comprising at least partially of copper, aluminum and nickel.

In a preferred embodiment of this variant of the invention the material comprises 60 to 90%, preferably about 80%, copper and the remainder as essential components at least aluminum and/or nickel.

Advantageously, the aforementioned remainder includes apart from aluminum and nickel also at least iron a component and the proportion of aluminum is greater than that of any other metal (apart from copper which is the main constituent of the material).

Particularly suitable is an alloy of about 80% copper, about 10% aluminum, about 5% nickel and about 4% iron. Such an alloy may also contain traces of other elements, for example zinc or manganese It has surprisingly been found that the material compositions according to the invention enumerated above and alloys for the igniters and electrodes substantially increase the life compared with known materials.

The materials enumerated above are thus not only advantageously suitable for use in igniters but also for the electrodes in excimer lasers, i.e., the main electrodes and the preionization electrodes.

I claim:

1. Ignitor for preionizing the gas in a gas-discharge excimer laser having a wall enclosing a gas space, said igniter comprising:
   an elongate electrically conductive core projecting through an opening in said wall with an inner end thereof positioned within the gas space, and
   a jacket formed of fluoroplastic material surrounding at least that portion of the length of said conductive core encircled by the opening in the wall and dimensioned and shaped for sealingly and insulatingly securing said conductive core to said wall.

2. Ignitor according to claim 1, wherein said electrically conductive core is secured with interference fit within said jacket.

3. Ignitor according to claim 1, wherein the fluoroplastic material forming said jacket is sprayed directly onto said electrically conductive core.

4. Ignitor according to claim 1, wherein said opening is cylindrical in shape and extends between outer and inner surfaces of the wall, and which for a first portion of its length inwardly from said outer wall surface is of larger diameter than a second portion of its length inwardly from said inner wall surface and has a conical surface disposed between the first and second portions,
   wherein said jacket has a cylindrical outer surface including a conical surface for complementary engaging the conical surface within said opening and a peripheral shoulder displaced from the conical surface in the direction of the outer wall surface, and
   wherein said jacket is secured in said wall with a pressure sleeve which surrounds said jacket and engages said peripheral shoulder for pressing the conical surface of the jacket into gas-sealing relationship with the conical surface in said opening.

5. Ignitor according to claim 1, wherein said electrically conductive core consists of a material comprising at least partially tungsten and copper.

6. Ignitor according to claim 4, wherein said electrically conductive core consists of a material comprising at least partially tungsten and copper.

7. Ignitor according to claim 1, wherein said electrically conductive core consists of a material comprising at least partially copper, aluminum and nickel.

8. Ignitor according to claim 4, wherein said electrically conductive core consists of a material comprising at least partially copper, aluminum and nickel.

* * * * *

UNITED STATES PATENT AND TRADEMARK OFFICE
CERTIFICATE OF CORRECTION

PATENT NO. : 4,980,894

DATED : December 25, 1990

INVENTOR(S) : Steinfuhrer

It is certified that error appears in the above-identified patent and that said Letters Patent is hereby corrected as shown below:

ON TITLE PAGE: 2nd col., 5th line, "4,685,272  4/1987" should read --4,635,272  1/1987--;
Col. 1, following the title, insert as a heading --BACKGROUND OF INVENTION--;
Col. 1, line 5, "igniter" should read --ignitor--;
Col. 1, line 31, "igniters" should read --ignitors--;
Col. 1, line 33, "igniters" should read --ignitors--;
Col. 1, line 37, "igniter" should read --ignitor--;
Col. 1, line 50, "igniter" should read --ignitor--;
Col. 1, line 54, "igniter" should read --ignitor--;
Col. 2, line 4, "plastic" should read --plastic.--;
Col. 2, line 8, "igniter" should read --ignitor--;
Col. 2, line 18, "polymer" should read --polymer.--;
Col. 2, line 26, "igniter" should read --ignitor--;
Col. 2, line 32, "igniter" should read --ignitor--;
Col. 2, line 34, "igniter" should read --ignitor--;
Col. 2, line 49, "igniter" should read --ignitor--;
Col. 2, line 62, "igniter" should read --ignitor--;
Col. 2, line 67, "igniter" should read --ignitor--;

UNITED STATES PATENT AND TRADEMARK OFFICE
CERTIFICATE OF CORRECTION

PATENT NO. : 4,980,894
DATED : December 25, 1990
INVENTOR(S) : Steinfuhrer

It is certified that error appears in the above-identified patent and that said Letters Patent is hereby corrected as shown below:

```
Col. 3, line 1,  "igniter" should read --ignitor--;
Col. 3, line 13, "igniter" should read --ignitor--;
Col. 3, line 21, "a" should read --as a--;
Col. 3, line 30, "igniters" should read --ignitors--;
Col. 3, line 33, "igniters" should read --ignitors--;
Col. 3, line 39, "igniter" should read --ignitor--; and
Col. 4, line 20, "complementary" should read
--complementarily--.
```

Signed and Sealed this

Seventh Day of July, 1992

*Attest:*

DOUGLAS B. COMER

*Attesting Officer*  Acting Commissioner of Patents and Trademarks